United States Patent
Hasegawa (10) Patent No.: US 9,233,670 B2
(45) Date of Patent: Jan. 12, 2016

(54) BAR-HANDLE VEHICLE BRAKE CONTROL APPARATUS

(71) Applicant: NISSIN KOGYO CO., LTD., Ueda, Nagano (JP)

(72) Inventor: Tetsuya Hasegawa, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 14/161,154

(22) Filed: Jan. 22, 2014

(65) Prior Publication Data

US 2014/0214300 A1 Jul. 31, 2014

(30) Foreign Application Priority Data

Jan. 25, 2013 (JP) ................................. 2013-012615

(51) Int. Cl.
*B60T 7/12* (2006.01)
*B60T 8/17* (2006.01)
*B60T 8/50* (2006.01)
*B62L 3/02* (2006.01)

(52) U.S. Cl.
CPC ................ *B60T 8/1706* (2013.01); *B60T 8/50* (2013.01); *B62L 3/023* (2013.01); *B60T 2230/03* (2013.01); *B60T 2240/06* (2013.01)

(58) Field of Classification Search
CPC ......... B60T 2240/06; B60T 8/52; B60T 8/00; B60T 8/3205
See application file for complete search history.

(56) References Cited

FOREIGN PATENT DOCUMENTS

| | | |
|---|---|---|
| DE | 102006054318 A1 | 5/2008 |
| EP | 1842755 A1 | 10/2007 |
| EP | 2266853 A1 | 12/2010 |
| JP | H05201317 | 8/1993 |
| JP | 06255468 | 9/1994 |
| JP | 2002029403 A | 1/2002 |
| JP | 2005335411 | 12/2005 |
| JP | 2007269290 | 10/2007 |
| JP | 2007271606 | 10/2007 |
| JP | 2009184486 | 8/2009 |
| JP | 2009539677 A | 11/2009 |
| WO | WO-0200483 A1 | 1/2002 |

OTHER PUBLICATIONS

EP Search Report for related Application No. 14152396.9-1756 dated Apr. 23, 2014, 5 pages.
JP Office Action for related Application No. 2013-012615 dated Jul. 30, 2015, 8 pages.
JP Office Action for related Application No. 2013-012615 dated Dec. 16, 2014, 4 pages.

*Primary Examiner* — Michael D Lang
(74) *Attorney, Agent, or Firm* — Andrew M. Calderon; Roberts Mlotkowski Safran & Cole, P.C.

(57) ABSTRACT

One embodiment provides a bar-handle vehicle brake control apparatus. The control apparatus includes an acceleration acquiring part and a control unit. The acceleration acquiring part acquires a tangential acceleration at a point where a straight line which connects a gravity center of a bar-handle vehicle and a front wheel axle intersects a circle which is centered at the front wheel axle. The control unit controls a front wheel brake based on the tangential acceleration.

22 Claims, 9 Drawing Sheets

BAR-HANDLE VEHICLE BRAKE CONTROL APPARATUS

CROSS-REFERENCE TO RELATED APPLICATION(S)

This application claims priority from Japanese Patent Application No. 2013-012615 filed on Jan. 25, 2013, the entire contents of which are incorporated herein by reference.

FIELD

Embodiments described herein generally relate to a bar-handle vehicle brake control apparatus which suppresses the occurrence of a rear wheel lift phenomenon in a bar-handle vehicle when the brakes are applied.

BACKGROUND

In bar-handle vehicles, a so-called rear wheel lift phenomenon (rear lift) may occur in which a rear wheel is lifted when the load is shifted to the side of a front wheel as a result of abrupt braking while the vehicle is running For example, JP-2002-029403-A proposes an anti-lock braking (ABS) control for a bar-handle vehicle in which a vehicle body deceleration is obtained based on wheel speeds and the occurrence of a rear lift is determined when the reduction degree of the vehicle body deceleration reaches the predetermined value.

Although it is intended for four-wheeled vehicles, JP-H06-255468-A proposes a technique in which, when abrupt braking is performed such that a temporal variation in vehicle body deceleration exceeds a predetermined value, the brake hydraulic pressures at front wheels are increased moderately so as to suppress the rear lift.

Although JP-2002-029403-A and JP-H06-255468-A disclose the technologies of suppressing the rear lift, in the field of bar-handle vehicles, there are still demands for a further improvement in the suppression of the rear lift to reduce further the influence on the running stability.

SUMMARY

One object of the present invention is to provide a bar-handle vehicle brake control apparatus which can preferably exhibit the rear lift suppression function. In view of above, following inventive aspects are defined.

Aspect 1 defines a bar-handle vehicle brake control apparatus including:

an acceleration acquiring part which acquires a tangential acceleration at a point where a straight line which connects a gravity center of a bar-handle vehicle and a front wheel axle intersects a circle which is centered at the front wheel axle; and a control unit which controls a front wheel brake based on the tangential acceleration.

According to Aspect 1, it is possible to determine a risk of occurrence of a rear lift in the bar-handle vehicle based on the acceleration acquired. Then, when there is the risk of occurrence of a rear lift, it is possible to control the front wheel brake by the control unit, and it is possible to preferably suppress the occurrence of a rear lift.

Aspect 2 defines the control apparatus of Aspect 1, wherein control unit controls the front wheel brake so that the tangential acceleration becomes zero.

According to Aspect 2, it is possible to suppress the occurrence of a rear lift effectively.

Aspect 3 defines the control apparatus of Aspect 1 or 2, wherein the control unit controls so that a hydraulic pressure at the front wheel brake is reduced when the hydraulic pressure at the front wheel brake needs to be reduced for a rear lift suppression and when a predetermined acceleration is generated in the bar-handle vehicle.

According to Aspect 3, it is possible to suppress the occurrence of a rear lift effectively when there is the risk of occurrence of a rear lift.

Aspect 4 defines the control apparatus of any one of Aspects 1 to 3, wherein the control unit selects either a pressure reduction control in an ABS control or a pressure reduction control for a rear lift suppression, which has a larger pressure reduction pulse, in preference to a holding control in the ABS control and a pressure increase control in the ABS control.

According to Aspect 4, it is possible to suppress the occurrence of a rear lift effectively when there is the risk of occurrence of a rear lift.

Aspect 5 defines the control apparatus of any one of Aspects 1 to 4, wherein the control unit includes a determination part which determines whether or not there is a risk of occurrence of a rear lift based on the tangential acceleration and an axle-directed acceleration which is directed to the front wheel axle, and wherein the determination part determines that a rear wheel is being lifted regardless of a component of the tangential acceleration when the axle-directed acceleration is equal to or smaller than a predetermined value.

According to Aspect 5, when the axle-directed acceleration is larger than the predetermined value, that is, when such a load as to contract a front fork of the front wheel largely is exerted on the front wheel while the vehicle is being decelerated, the control unit determines that there is a risk of occurrence of a rear lift, whereby a rear lift suppression is preferably exhibited.

Aspect 6 defines the control apparatus of Aspect 1, wherein the control unit controls the front wheel brake so that a vehicle body acceleration "a" of the bar-handle vehicle is in a relationship expressed by the following expression (1):

$$a \leq g \times \cos(\theta+\beta)/\sin\theta \qquad (1),$$

where g is a gravitational acceleration, where θ is an angle formed by the straight line which passes through the gravity center of the bar-handle vehicle and the front wheel axle and a road surface, and where β is an inclination angle of the road surface.

According to Aspect 6, it is possible to suppress the occurrence of a rear lift effectively. Compared with a case where a rear lift suppression control is executed based only on wheel speed, there is no need to take road surface conditions and wear of a tire into consideration, and it is possible to exhibit the rear lift suppression function simply and in an ensured fashion.

Aspect 7 defines a bar-handle vehicle brake control apparatus, including an acceleration acquiring part which acquires a tangential acceleration at a point where a straight line which connects a gravity center of a bar-handle vehicle and a ground contact point of a front wheel intersects a circle which is centered at the ground contact point of the front wheel; and a control unit which controls a front wheel brake based on the tangential acceleration.

According to Aspect 7, it is possible to determine a risk of occurrence of a rear lift in the bar-handle vehicle based on the acceleration acquired. Then, when there is the risk of occurrence of a rear lift, it is possible to control the front wheel brake by the control unit, and it is possible to preferably suppress the occurrence of a rear lift.

Aspect 8 defines the control apparatus of Aspect 7, wherein the control unit controls the front wheel brake so that the tangential acceleration becomes zero.

According to Aspect 8, it is possible to suppress the occurrence of a rear lift effectively.

Aspect 9 defines the control apparatus of Aspect 7 or 8, wherein the control unit controls so that a hydraulic pressure at the front wheel brake is reduced when the hydraulic pressure at the front wheel brake needs to be reduced for a rear lift suppression and when a predetermined acceleration is generated in the bar-handle vehicle.

According to Aspect 9, it is possible to suppress the occurrence of a rear lift effectively when there is the risk of occurrence of a rear lift.

Aspect 10 defines the control apparatus of any one of Aspects 7 to 9, wherein the control unit selects either a pressure reduction control in an ABS control or a pressure reduction control for a rear lift suppression, which has a larger pressure reduction pulse, in preference to a holding control in the ABS control and a pressure increase control in the ABS control.

According to Aspect 10, it is possible to suppress the occurrence of a rear lift effectively when there is the risk of occurrence of a rear lift.

Aspect 11 defines the control apparatus of any one of Aspects 7 to 10, wherein the control unit includes a determination part which determines whether or not there is a risk of occurrence of a rear lift based on the tangential acceleration and a ground contact point-directed acceleration which is directed to the ground contact point of the front wheel, and wherein the determination part determines that a rear wheel is being lifted regardless of a component of the tangential acceleration when the ground contact point-directed acceleration is equal to or smaller than a predetermined value.

According to Aspect 11, when the ground contact point-directed acceleration is larger than the predetermined value, that is, when such a load as to contract a front fork of the front wheel largely is exerted on the front wheel while the vehicle is being decelerated, the control unit determines that there is a risk of occurrence of a rear lift, whereby a rear lift suppression is preferably exhibited.

Aspect 12 defines the control apparatus of Aspect 7, wherein, when the bar-handle vehicle is decelerated, the control unit controls the front wheel brake so that a vehicle body acceleration "a" of the bar-handle vehicle is in a relationship expressed by the following expression (2):

$$a \leq g \times \cos(\theta+\beta)/\sin \theta \quad (1),$$

where g is a gravitational acceleration, where θ1 is an angle formed by the straight line which passes through the gravity center of the bar-handle vehicle and the ground contact point of the front wheel and a road surface, and where β is an inclination angle of the road surface.

According to Aspect 12, it is possible to suppress the occurrence of a rear lift effectively. Compared with a case where a rear lift suppression control is executed based only on wheel speed, there is no need to take road surface conditions and wear of a tire into consideration, and it is possible to exhibit the rear lift suppression function simply and in an ensured fashion.

According to the invention, the bar-handle vehicle brake control apparatus is obtained which can preferably exhibit the rear lift suppression function.

DETAILED DESCRIPTION

Embodiments will be described. Like reference numerals will be given to like portions, and repeated descriptions will be omitted.

(First Embodiment)

Figure 1:
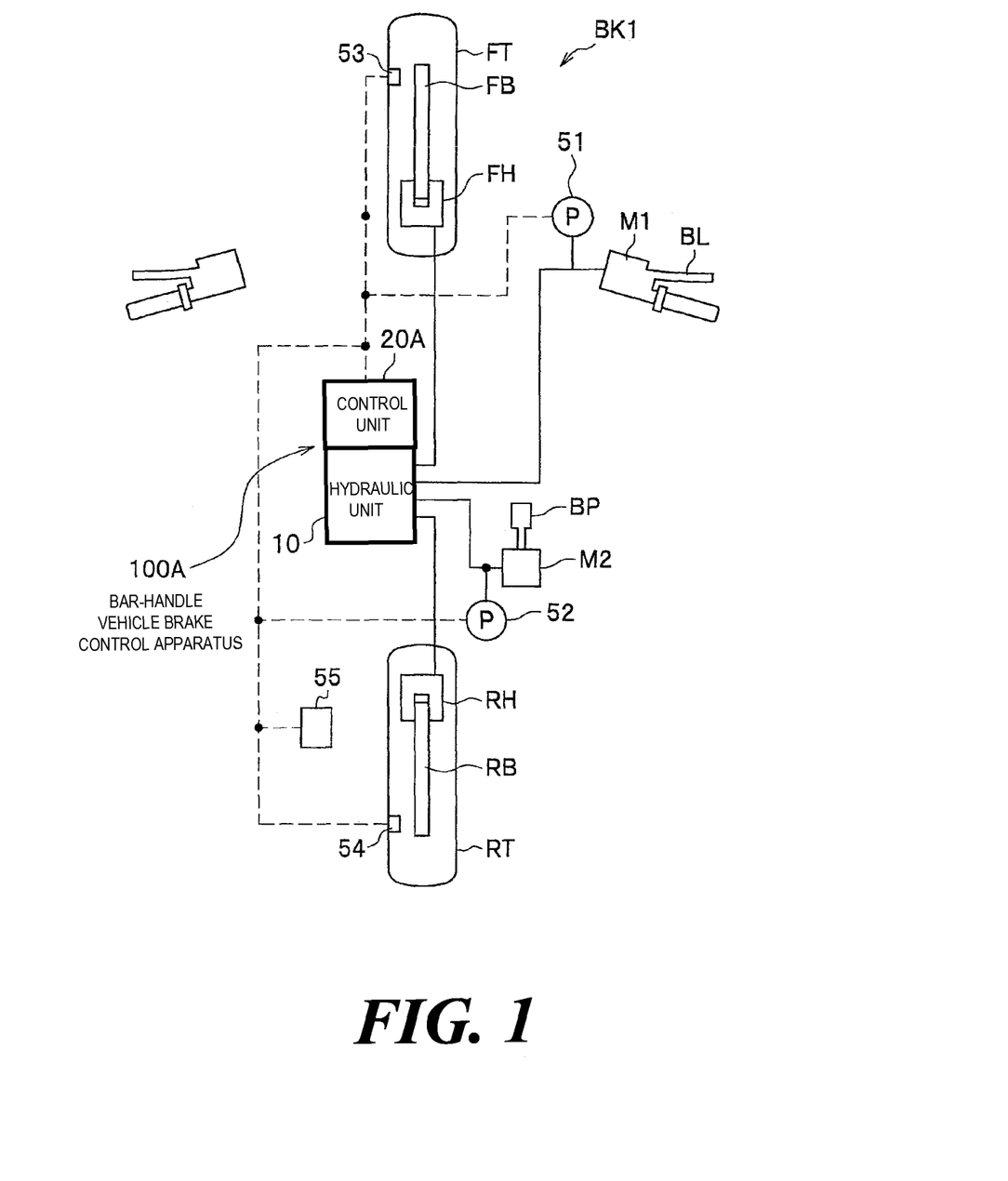
FIG. 1 is a block diagram of a motorcycle which is equipped with a bar-handle vehicle brake control apparatus according to a first embodiment.

As shown in FIG. 1, a bar-handle vehicle brake control apparatus (brake control apparatus) 100A is intended, for example, to control, as required, braking forces (brake hydraulic pressures) which are given to a front wheel FT and a rear wheel RT (wheels FT, RT) of a motorcycle or a vehicle BK1 which includes wheel brakes which are provided individually at the front wheel FT and the rear wheel RT, as well as control devices for controlling the wheel brakes such as a control lever and a brake pedal which are provided independently for the front and rear wheel brakes.

The brake control apparatus 100A includes mainly a hydraulic unit 10 and a control unit 20A. Fluid lines (flow paths of brake fluid) and various components are provided in the hydraulic unit 10, and the control unit 20A functions as a control unit for controlling the various components in the hydraulic unit 10 as required.

A first pressure sensor 51 and a second pressure sensor 52 (pressure sensors 51, 52), a front wheel speed sensor 53 and a rear wheel speed sensor 54 (wheel speed sensors 53, 54) and an acceleration sensor 55 are connected to the control unit 20A.

Figure 5:
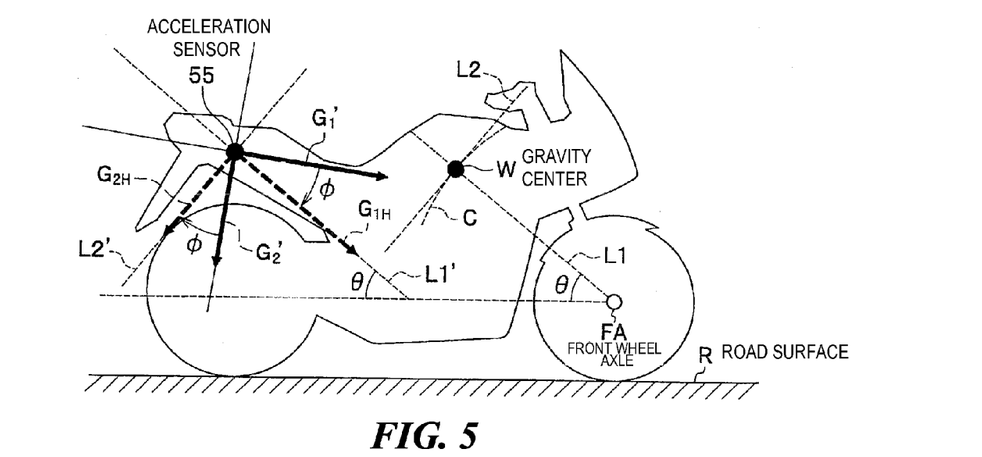
FIG. 5 is a schematic diagram of a bar-handle vehicle which shows a relationship between an acceleration censor and a gravity center of the vehicle.

The first and second pressure sensors 51, 52 detect brake hydraulic pressures generated by a first master cylinder M1 and a second master cylinder M2 (a first master cylinder pressure, a second master cylinder pressure). The front and rear wheels' wheel speed sensors 53, 54 detect wheel speeds of the front wheel FT and the rear wheel RT (a front wheel speed $V_F$, a rear wheel speed $V_R$, refer to FIG. 3). The acceleration sensor 55 detects an acceleration of the vehicle BK1. As shown in FIG. 5, the acceleration sensor 55 is disposed at a rear portion of a vehicle body of the bar-handle vehicle and detects an acceleration $G_1'$ which follows along a front-to-rear or longitudinal direction of the vehicle body and an acceleration $G_2'$ which follows along the direction of the gravity of the vehicle body. Here, a coordinate axis of the acceleration $G_1'$ is inclined with respect to a horizontal direction when the bar-handle vehicle BK1 rests on a horizontal road surface R, and a coordinate axis of the acceleration $G_2'$ is inclined with respect to a vertical direction.

The position where the acceleration sensor 55 is placed and the coordinate axis of the acceleration $G_1'$ (the coordinate axis of the acceleration $G_2'$) can be set arbitrarily.

The control unit 20A includes, for example, a CPU, a RAM, a ROM and an input/output circuit and executes various arithmetic operations for control based on inputs from the individual pressure sensors 51, 52 and the individual wheel speed sensors 53, 54 and programs and data which are stored in the ROM.

A front wheel cylinder FH is a hydraulic unit which converts a brake hydraulic pressure generated by the first master cylinder M1 and the brake control apparatus 100A into a working force of a front brake FB which is provided at the front wheel FT. A rear wheel cylinder RH is a hydraulic unit which converts a brake hydraulic pressure generated by the second master cylinder M2 and the brake control unit 100A into a working force of a rear brake RB which is provided at the rear wheel RT. The front wheel cylinder FH and the rear wheel cylinder RH are connected individually to the hydraulic unit 10 via pipings.

(Hydraulic Unit 10)

Figure 2:
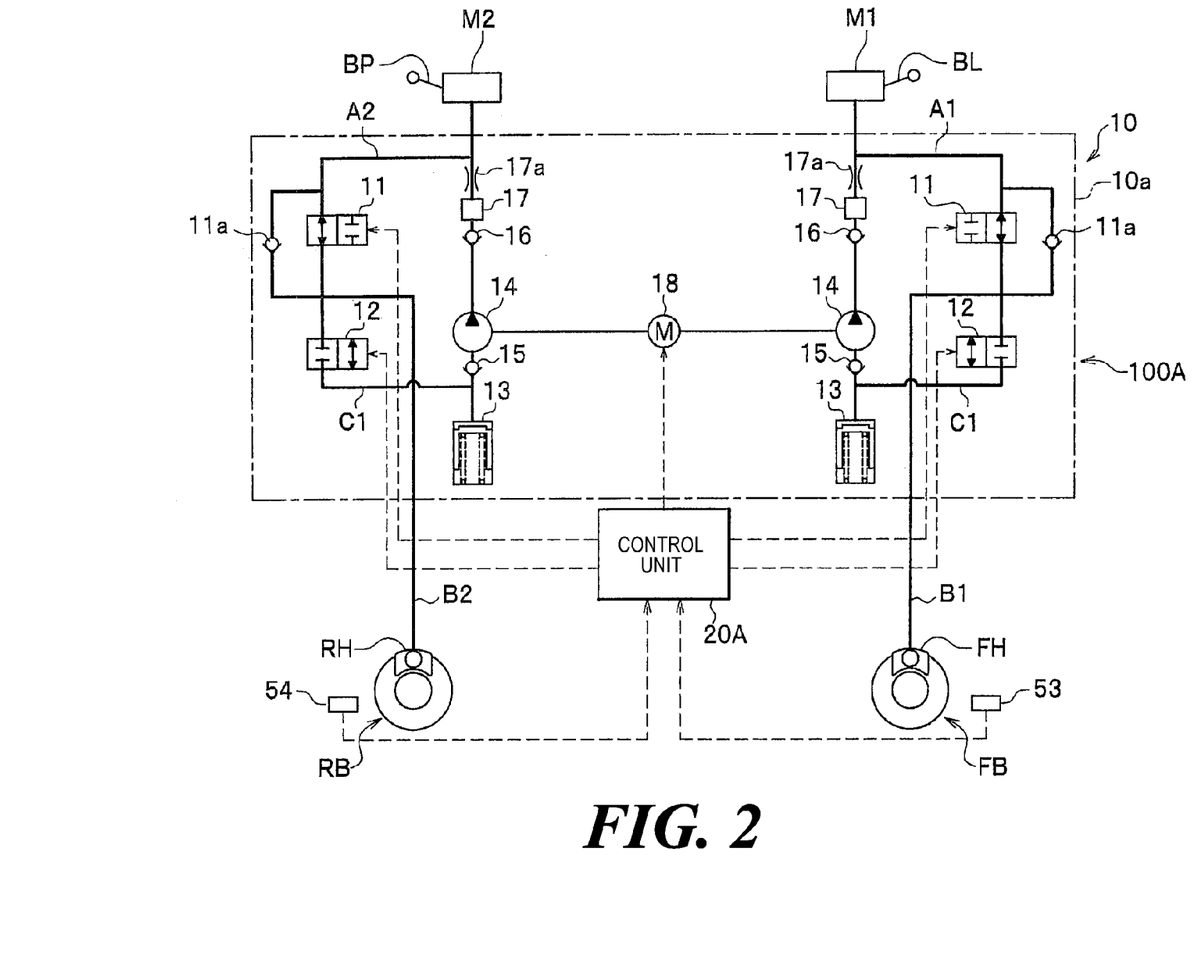
FIG. 2 is a brake hydraulic circuit diagram of the bar-handle vehicle brake control apparatus.

As shown in FIG. 2, the hydraulic unit 10 of the brake control apparatus 100A is disposed between the first master cylinder M1 and the second master cylinder M2 and the front wheel brake FB and the rear wheel brake RB and includes a pump body 10a which is a base member having fluid lines through which a brake fluid flows and pluralities of inlet valves 11, outlet valves 12 and the like which are disposed on the fluid lines.

The first master cylinder M1 generates a brake hydraulic pressure which corresponds to an effort which is exerted on a brake lever BL by the rider and is connected to the front wheel cylinder FH by way of an output hydraulic line A1 which is formed in the pump body 10a and a wheel hydraulic line B1. The second master cylinder M2 generates a brake hydraulic pressure which corresponds to an effort which is exerted on a brake pedal BP by the rider and is connected to the rear wheel cylinder RH by way of an output hydraulic line A2 which is formed in the pump body 10a and a wheel hydraulic line B2.

A fluid line connected to the first master cylinder M1 is normally allowed to communicate from the first master cylinder M1 to the front wheel cylinder FH, so that an operation effort exerted on the brake lever BL is transmitted to the front wheel brake FB. A fluid line connected to the second master cylinder M2 is normally allowed to communicate from the second master cylinder M2 to the rear wheel cylinder RH, so that an operation effort exerted on the brake pedal BP is transmitted to the rear wheel brake RB.

The inlet valve 11, the outlet valve 12 and a check valve 11a are provided on each of the fluid line which connects the first master cylinder M1 with the front wheel cylinder FH and the fluid line which connects the second master cylinder M2 with the rear wheel cylinder RH.

In the pump body 10a, a reservoir 13, a pump 14, a suction valve 15, a discharge valve 16, a damper 17 and an orifice 17a are provided for each of the first master cylinder M1 and the second master cylinder M2. The hydraulic unit 10 includes an electric motor 18 which drives the two pumps 14.

The inlet valves 11 are normally open solenoid valves and are provided individually between the first master cylinder M1 and the front wheel cylinder FH (between the output hydraulic line A1 and the wheel hydraulic line B1) and between the second master cylinder M2 and the rear wheel cylinder RH (between the output hydraulic line A2 and the wheel hydraulic line B2). The individual inlet valves 11 are normally opened to thereby permit the transmission of brake hydraulic pressure from the first master cylinder M1 to the front wheel cylinder FH and from the second master cylinder M2 to the rear wheel cylinder RH. The individual inlet valves 11 are closed by the control unit 20A when the front wheel FT and the rear wheel RT are about to be locked to thereby cut off the brake hydraulic pressure which is supplied from the brake lever BL to the front wheel brake FB and the brake hydraulic pressure which is supplied from the brake pedal BP to the rear wheel brake RB.

The outlet valves 12 are normally closed solenoid valves and are provided individually between the front wheel cylinder FH and the reservoir 13 (on an open line C1) and between the rear wheel cylinder RH and the reservoir 13 (on an open line C2). The individual outlet valves 12 are normally closed. However, when the front wheel FT and the rear wheel RT are about to be locked, the outlet valves 12 are opened by the control unit 20A to thereby release the brake hydraulic pressures exerted on the front wheel brake FB and the rear wheel RB to the corresponding reservoirs 13.

The check valves 11a are connected to the corresponding inlet valves 11 in parallel. These check valves 11a are valves which permit only flows of brake fluid from the front wheel cylinder FH towards the first master cylinder M1 and from the rear wheel cylinder RH towards the second master cylinder M2. When inputs from the brake lever BL and the brake pedal BP are released, even with the inlet valves 11 kept closed, the check valves 11a permit the flow of brake fluid from the individual wheel cylinders FH, RH to the individual master cylinders M1, M2.

The reservoirs 13 function to reserve the brake fluid pressure released thereto as a result of the individual outlet valves 12 being opened.

The pumps 14 each include the suction valve 15 and the discharge valve 16 and have a function to suck the brake fluid reserved in the reservoirs 13 to return the brake fluid towards the master cylinders M1, M2. In FIG. 2, while the pumps 14, the suction valves 15 and the discharge valves 16 are depicted as being separate from one another, in this embodiment, the suction valve 15 and the discharge valve 16 are integrally incorporated into each of the pumps 14.

The suction valves 15 are provided individually between the reservoirs 13 and upstream sides of the pumps 14. The section valves 15 constitute valves which permit only a flow of brake fluid from the reservoirs 13 towards the upstream sides of the pumps 14.

The discharge valves 16 are provided individually between downstream sides of the pumps 14 and the master cylinders Ml, M2 and constitute valves which permit only a flow of brake fluid from the downstream sides of the pumps 14 towards the master cylinders M1, M2. The pulsation of the brake fluid which is discharged towards the master cylinders M1, M2 via the discharge valves 16 is absorbed by the orifices 17a of the dampers 17.

Following this, the control unit 20A according to this embodiment will be described.

Figure 3:
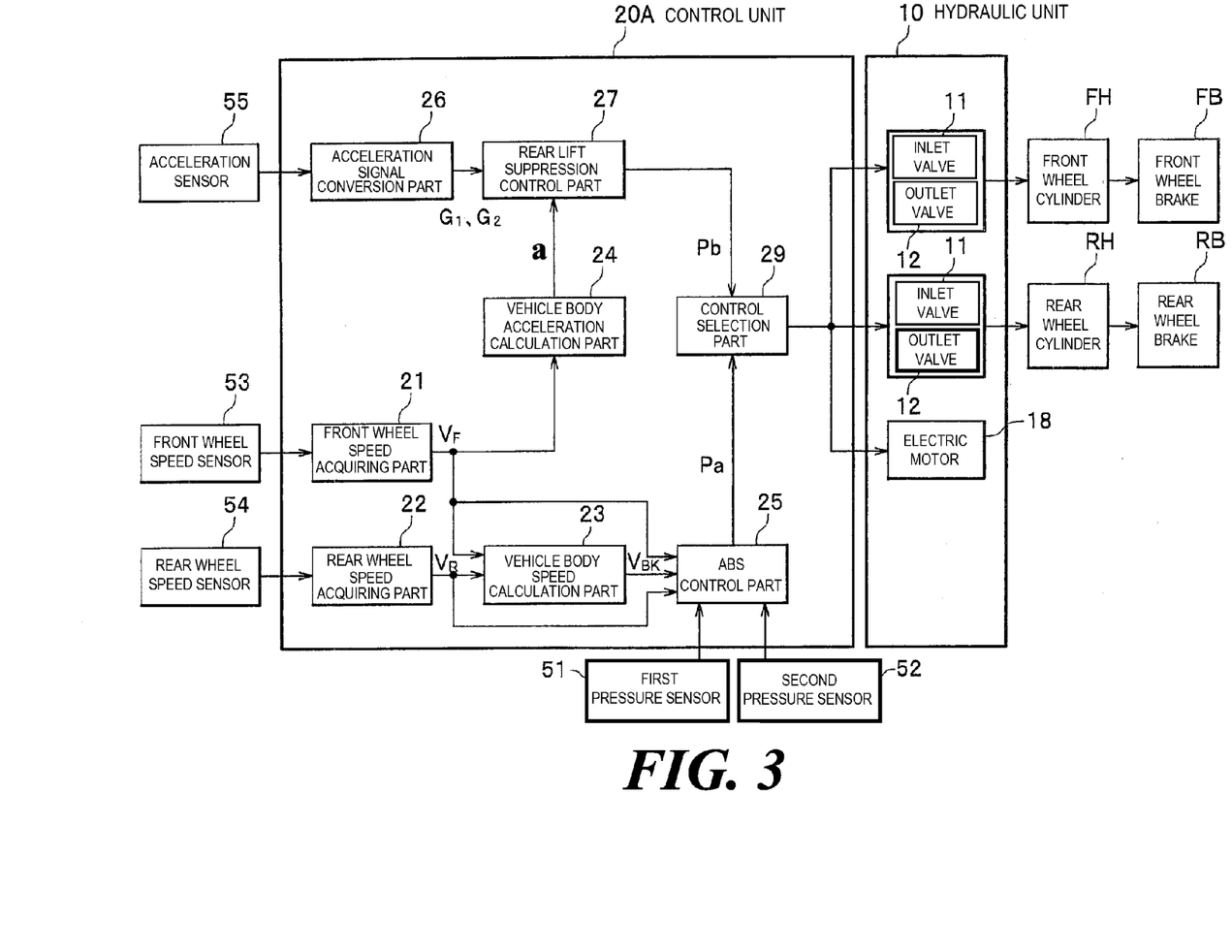
FIG. 3 is a block diagram of the bar-handle vehicle brake control apparatus according to the first embodiment.

As shown in FIG. 3, the control unit 20A includes, as functioning parts, a front wheel speed acquiring part 21, a rear wheel speed acquiring part 22, a vehicle body speed calculation part 23, a vehicle body acceleration calculation part 24, an ABS control part 25, an acceleration signal conversion part 26, a rear lift suppression control part 27 and a control selection part 29.

(Front Wheel Speed Acquiring Part 21)

The front wheel speed acquiring part 21 acquires a front wheel speed $V_F$ detected by the front wheel speed sensor 53.

The acquired front wheel speed $V_F$ is outputted to the vehicle body speed calculation part 23, the vehicle body acceleration calculation part 24 and the ABS control part 25.

(Rear Wheel Speed Acquiring Part 22)

The rear wheel speed acquiring part 22 acquires a rear wheel speed $Y_R$ detected by the rear wheel speed sensor 54.

The acquired rear wheel speed $Y_R$ is outputted to the vehicle body speed calculation part 23, the vehicle body acceleration calculation part 24 and the ABS control part 25.

(Vehicle Body Speed Calculation Part 23)

The vehicle body speed calculation part 23 calculates a vehicle body speed $V_{BK}$ by using the front wheel speed $Y_F$ and the rear wheel speed $Y_R$. A known method can be used as a calculation method of calculating the vehicle body speed $V_{BK}$. For example, the vehicle body speed $V_{BK}$ is obtained based on the front wheel speed $Y_F$ detected by the front wheel speed sensor 53 and the rear wheel speed $Y_R$ detected by the rear wheel speed sensor 54 by using the following expression (3).

$$V_{BK}=(Y_F+V_R)/2 \qquad (3)$$

The calculated vehicle body speed $V_{BK}$ is outputted to the ABS control part 25.

(Vehicle Speed Acceleration Calculation Part 24)

The vehicle body acceleration calculation part 24 calculates a vehicle body acceleration "a" based on the front wheel speed $V_F$. A known method can be used as a calculation method of calculating the vehicle body acceleration "a." For example, a front wheel speed $V_F$ is stored in a predetermined cycle for updating, and the current vehicle body acceleration "a" is calculated by using the front wheel speed $V_F$ acquired currently and the front wheel speed $V_F$ which was stored in the cycle one before the current updating cycle.

The calculated vehicle body acceleration "a" is outputted to the rear lift suppression control part 27.

(ABS Control Part 25)

The ABS control part 25 determines on the necessity of carrying out an ABS control on each of the wheel brakes FB, RB based on the front wheel speed $V_F$, the rear wheel speed $Y_R$ and the vehicle body speed $V_{BK}$. Then, when having determined that the ABS control is necessary based on the vehicle body speed $V_{BK}$ and the slip rate, the ABS control part 25 controls the respective braking forces of the wheel brakes FB, RB through ABS control (a pressure reduction control, a holding control, a pressure increase control) by controlling driving amounts of the individual inlet valves 11, the individual outlet valves 12 and the electric motor 18 to thereby suppress the slippage of the front wheel FT and the rear wheel RT when the brakes are applied.

An ABS control signal Pa by the ABS control part 25 is outputted to the control selection part 29.

(Acceleration Signal Conversion Part 26)

The acceleration signal conversion part 26 functions as an acceleration signal acquiring part which acquires an acceleration $G_1'$ and an acceleration $G_2'$ which are detected by the acceleration sensor 55, the acceleration $G_1'$ following the longitudinal direction of the vehicle, the acceleration $G_2'$ following the direction of the gravity of the vehicle, as shown in FIG. 5. The acceleration signal conversion part 26 also functions to convert these accelerations $G_1'$, $G_2'$ into accelerations $G_{1H}$, $G_{2H}$ whose coordinate axes L1', L2' are parallel to coordinate axes of accelerations $G_1$, $G_2$ (refer to FIG. 6) which pass through the gravity center W of the vehicle. The converted accelerations $G_{1H}$, $G_{2H}$ approximate to the accelerations $G_1$, $G_2$ (refer to FIG. 6) which pass through the gravity center W of the vehicle, and in this embodiment, the converted accelerations $G_{1H}$, $G_{2H}$ are used as the accelerations $G_1$, $G_2$ which are acquired at the gravity center W of the vehicle.

Figure 6:
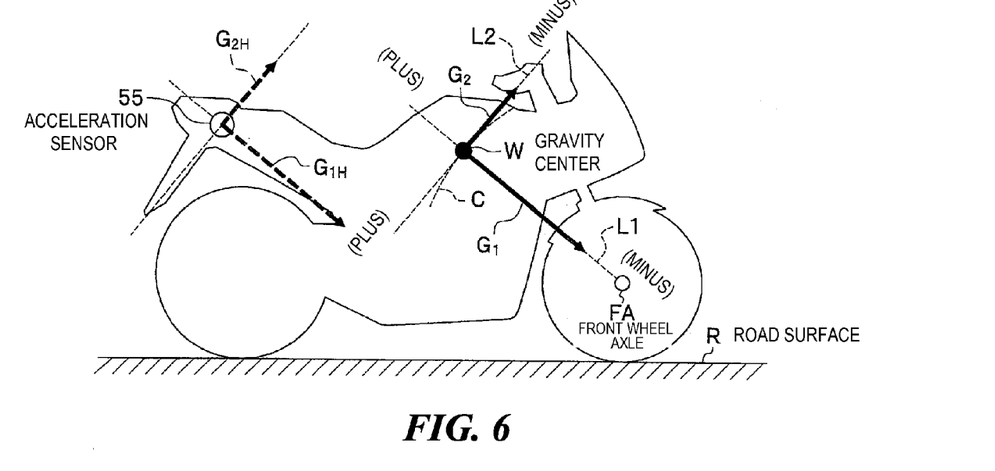
FIG. 6 is a schematic diagram showing acceleration which is applied to the periphery of the gravity center.

The coordinate axis of the acceleration $G_{1H}$ is parallel to a straight line L1 which connects the gravity center W of the vehicle with a front wheel axle FA, and the coordinate axis of the acceleration $G_{2H}$ is a parallel to a tangent L2 at a point where the straight line L1 intersects a circle C which is centered at the axle. The accelerations $G_{1H}$, $G_{2H}$ are obtained by the following expressions (4), (5).

$$G_{1H}=G_1'\times\cos\phi+G_2'\times\sin\phi \qquad (4)$$

$$G_{2H}=G_2'\times\sin\phi+G_2'\times\cos\phi \qquad (5)$$

where $\phi$ denotes a coordinate rotation angle.

The accelerations $G_{1H}$, $G_{2H}$ obtained are replaced as the accelerations $G_1$, $G_2$ which pass through the gravity center W of the vehicle and are outputted to the rear lift suppression control part 27.

As shown in FIG. 6, in the acceleration $G_1$ on the straight line L1 which passes through the gravity center W of the vehicle, an acceleration directed from the gravity center W of the vehicle towards the front wheel axle FA is a minus acceleration, and an acceleration directed in a direction opposite to the minus acceleration is a plus acceleration. In the acceleration $G_2$ on the tangent L2 which passes through the gravity center W of the vehicle, an acceleration directed from the gravity center W of the vehicle in a direction opposite to the direction of gravity is a minus acceleration, and an acceleration directed in the direction of gravity is a plus acceleration.

When the bar-handle vehicle is decelerated, as indicated by a thick arrow on the straight line L1 in FIG. 6, a minus acceleration $G_1$ is applied, and as indicated by a thick arrow on the tangent L2, a minus acceleration $G_2$ is applied.

Figure 7:
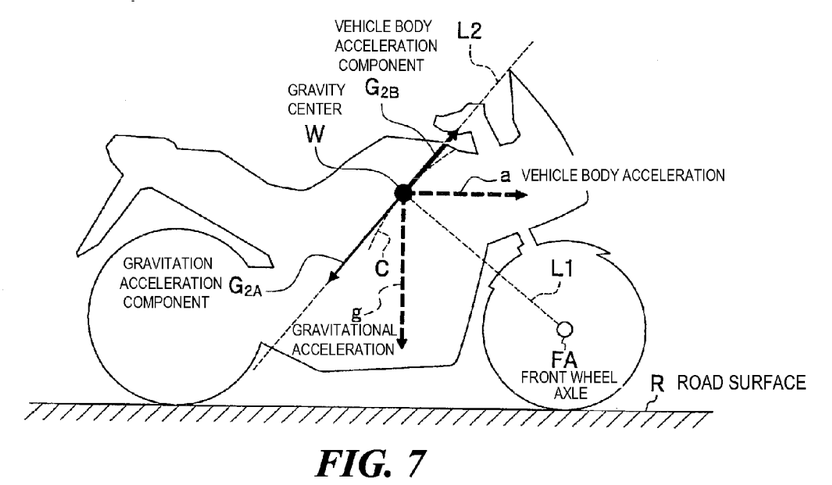
FIG. 7 is a schematic diagram showing a relationship between a vehicle body acceleration component and a gravity component.

Here, the acceleration $G_2$ is, as shown in FIG. 7, a difference between a component $G_{2A}$ of the gravitational acceleration in the direction of the tangent L2 and a component $G_{2B}$ of the vehicle body acceleration in the direction of the tangent L2 and is obtained by the following expression (6).

$$G_2=G_{2A}-G_{2B} \qquad (6)$$

Namely, a rear lift is suppressed when the acceleration $G_2$ is a plus acceleration by the expression (6) above, and on the contrary to this, when the acceleration $G_2$ becomes a minus acceleration (when the component $G_{2B}$ of the vehicle body acceleration becomes larger than the component $G_{2A}$ of the gravitational acceleration), there is caused a risk of occurrence of a rear lift.

(Rear Lift Suppression Control Part 27)

Figure 4:
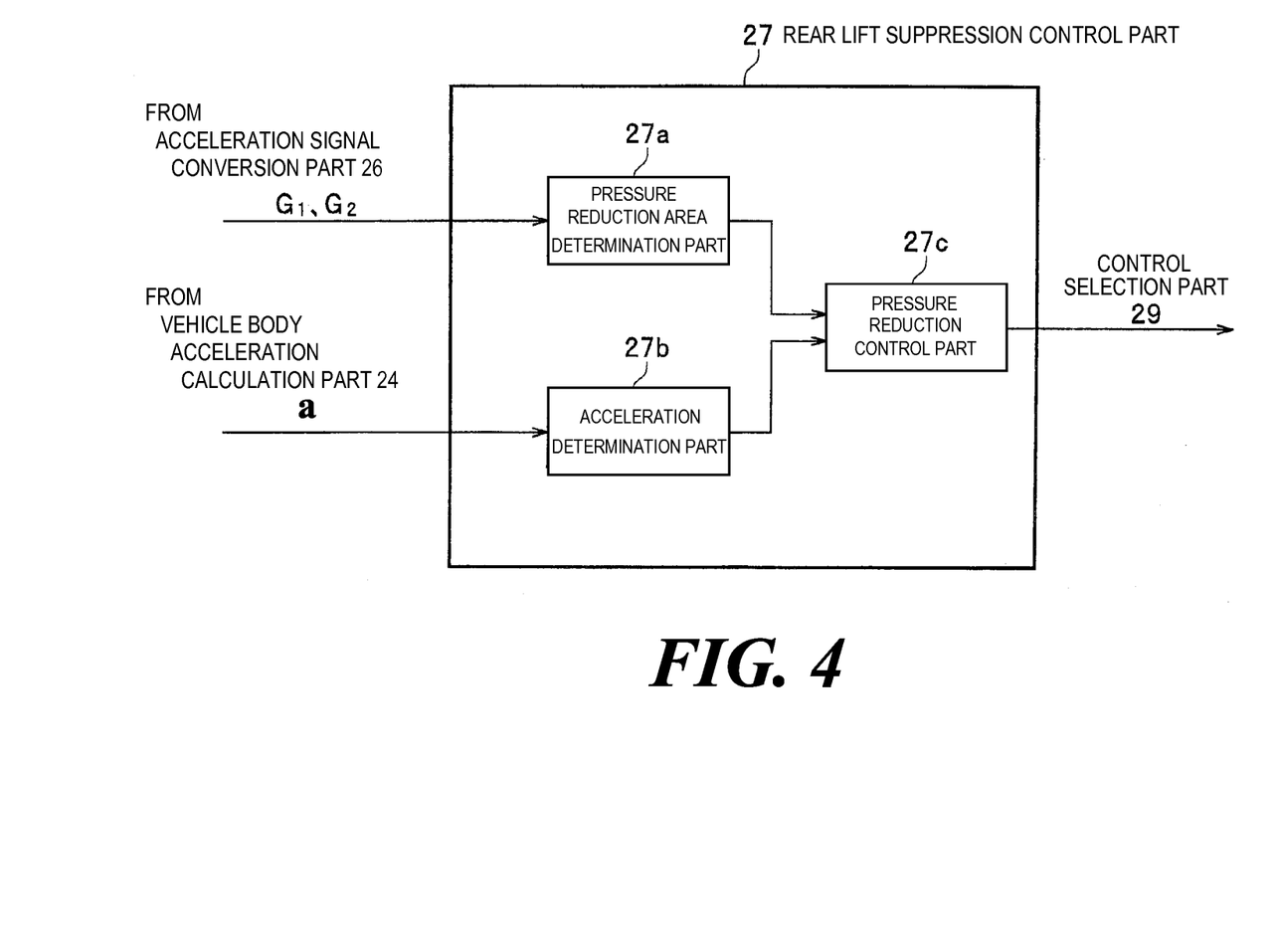
FIG. 4 is a block diagram showing in detail a rear lift suppression part.

As shown in FIG. 4, the rear lift suppression control part 27 includes a pressure reduction area determination part 27a as a determination part, an acceleration determination part 27b and a pressure reduction control part 27c.

Figure 8:
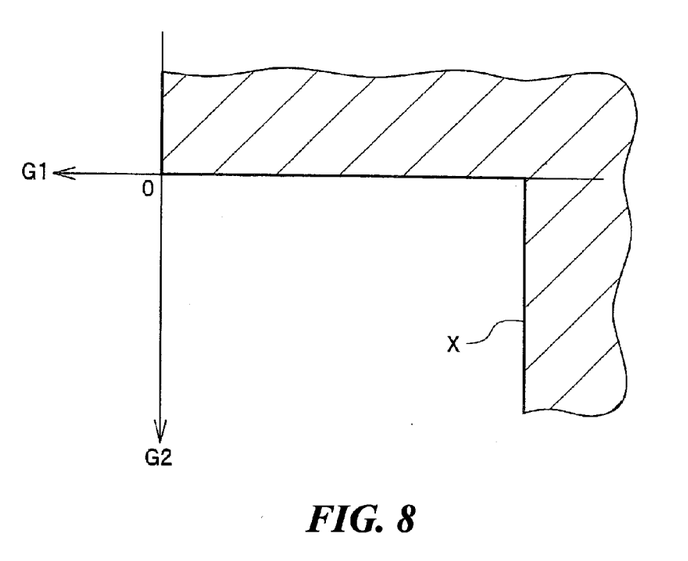
FIG. 8 is a graph showing a pressure reduction area.

The pressure reduction area determination part 27a determines whether or not a pressure reduction control needs to be carried out on the front wheel brake FB to suppress the occurrence of a rear lift based on the accelerations $G_1$, $G_2$. As a determination method, as shown in FIG. 8, it is determined that the pressure reduction control is necessary to suppress the occurrence of a rear lift when the accelerations $G_1$, $G_2$ reside in a pressure reduction area indicated by slanting lines in the figure.

The pressure reduction area is set in an area where the acceleration $G_1$ is minus ($G_1<0$) and the acceleration $G_2$ is minus ($G_2<0$), as well as an area where the acceleration $G_1$ is equal to or smaller than a predetermined value X (X<0). The reason that an area where $G_1$ is equal to and larger than 0 ($G_1 \geq 0$) is that the area indicates a state in which no load is being applied to the front fork of the front wheel FT and a state in which no rear lift cannot be generated.

When the acceleration G2 is minus, the component $G_{2B}$ of the vehicle body acceleration is larger than the component $G_{2A}$ of the gravitational acceleration, and there is a risk of occurrence of a rear lift. The predetermined value X estimates a case where a load is applied to the front wheel FT which is large enough to contract the front fork of the front wheel FT largely. When $G_1<X$, there is a risk of occurrence of a rear lift irrespective of the value of the acceleration $G_2$.

The result of the determination by the pressure reduction area determination part 27a is outputted to the pressure reduction control part 27c.

The acceleration determination part 27b determines whether or not a predetermined acceleration is being generated based on the vehicle body acceleration "a." For example, when the absolute value of the vehicle body acceleration "a" detected at the vehicle body acceleration calculation part 24 is larger than a threshold (for example, 0.7 G), the acceleration determination part 27b determines that the predetermined acceleration is being generated.

The result of the determination by the acceleration determination part 27b is outputted to the pressure reduction control part 27c.

The pressure reduction control part 27c determines whether or not a pressure reduction control should be executed to suppress the occurrence of a rear lift based on the result of the determination by the pressure reduction area determination part 27a and the result of the determination by the acceleration determination part 27b. The pressure reduction control part 27c prepares a pressure reduction control signal Pb for suppression of the occurrence of a rear lift when the pressure reduction area determination part 27a determines that a pressure reduction control needs to be carried out on the front wheel brake FB for suppression of the occurrence of a rear lift and the acceleration determination part 27b determines that the predetermined acceleration is being generated.

The prepared pressure reduction control signal Pb is outputted to the control selection part 29, and a pressure reduction control is carried out on the front wheel brake FB so that the acceleration $G_2$ becomes zero.

Figure 9:
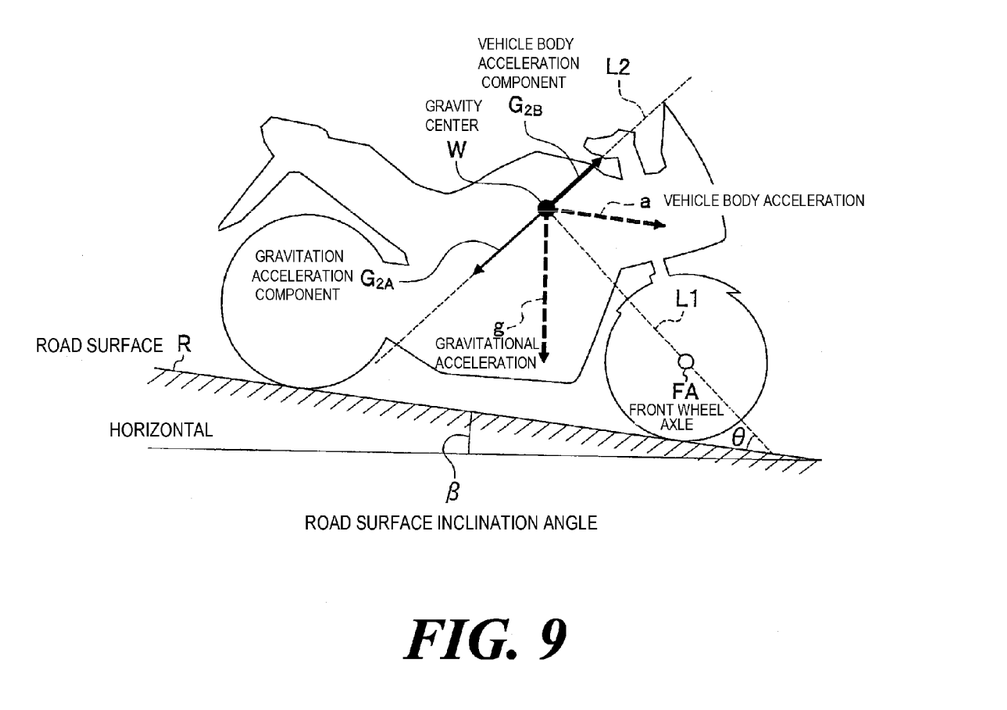
FIG. 9 is a schematic diagram showing a relationship between a vehicle body acceleration component and a gravity component when a road surface is inclined.

For example, as shown in FIG. 9, when the vehicle BK1 is running on a downhill of a road surface inclination angle β (a gradient β), the component $G_{2B}$ of the vehicle body acceleration and the component $G_{2A}$ of the gravitational acceleration are obtained by the following expressions (7), (8).

$$G_{2B} = a \times \sin \theta \quad (7)$$

$$G_{2A} = g \times \cos(\theta + \beta) \quad (8)$$

where g denotes the gravitational acceleration and θ denotes the angle formed by the straight line L1 which passes through the gravity center W of the bar-handle vehicle and the front wheel axle FA and the road surface R.

The reason that the gradient β of the downhill is not taken into consideration in the expression (8) is based on the fact that the value acquired by the acceleration sensor 55 when the vehicle BK1 is running on a downhill and the value acquired by the acceleration sensor 55 when the vehicle BK1 is running on a flat road are almost equal and that limit accelerations at which a rear lift occurs on the downhill and the flat road are almost equal.

In this embodiment, the pressure reduction control is carried out on the front wheel brake FB based on the expressions (7), (8) so that the acceleration "a" is in a relationship expressed by the following expression (1).

$$a \leq g \times \cos(\theta + \beta) / \sin \theta \quad (1)$$

The pressure reduction control part 27c outputs the pressure reduction control signal Pb for suppression of the occurrence of a rear lift to the control selection part 29 so that the relationship expressed by the expression (1) above results.
(Control Selection Part 29)

The control selection part 29 has a function to select the control of high priority when the ABS signal Pa and the pressure reduction control signal Pb are inputted thereinto from the ABS control part 25 and the rear lift suppression control part 27, respectively.

The control selection part 29 selects, in the decreasing order of priority, firstly either "the pressure reduction control in the ABS control" or "the pressure reduction control for suppression of the occurrence of a rear lift" which has a larger pressure reduction pulse, secondly the holding control in the ABS control, and thirdly the pressure increase control in the ABS control. Namely, the pressure reduction control is a control to which the highest priority is given.

The control signal selected by the control selection part 29 is outputted to the hydraulic unit 10.

Following this, a method of controlling the braking force of the front wheel brake FB by the control unit 20A according to this embodiment will be described.

When the rider controls the brake lever BL to input an operation effort into the front wheel brake FB to generate a braking force in the front wheel brake FB, the vehicle BK1 is slowed or decelerated, and the vehicle body speed $V_{BK}$ reduces.

Then, during the deceleration of the vehicle BK1, when the acceleration $G_2$ detected by the acceleration sensor 55 becomes the minus acceleration $G_2$ and the component $G_{2B}$ of the vehicle body acceleration takes a larger value than that of the component $G_{2A}$ of the gravitational acceleration, the pressure reduction area determination part 27a of the rear lift suppression control part 27 determines that the pressure reduction control for suppression of the occurrence of a rear lift is necessary. In parallel with this, the acceleration determination part 27b determines whether or not the predetermined acceleration is being generated based on the vehicle body acceleration "a," and when the acceleration determination part 27b determines that the predetermined acceleration is being generated, a request for pressure reduction control for suppression of the occurrence of a rear lift is made by the pressure reduction control part 27c, and the pressure reduction control signal Pb which signals that the pressure reduction control should be carried out on the front wheel brake FB is outputted to the control selection part 29 by the rear lift suppression control part 27.

Then, the control selection part 29 selects the pressure reduction control for suppression of the occurrence of a rear lift as the control of highest priority when the pressure reduction control signal Pa of the ABS control has not yet been inputted thereinto, and controls the hydraulic unit 10 for pressure reduction at the front wheel brake FB.

Pressure reduction at the front wheel brake FB is performed so that the vehicle body acceleration "a" is put in the relationship expressed by the expression (1) above, whereby the occurrence of a rear lift is suppressed.

Thus, according to the brake control apparatus 100A of this embodiment which has been described heretofore, it is possible to determine on the risk of occurrence of a rear lift in the bar-handle vehicle based on the acceleration $G_2$ obtained. Then, when there is the risk of occurrence of a rear lift, the pressure reduction control can be carried out on the front wheel brake FB by the control unit 20A. Consequently, the occurrence of a rear lift can be suppressed preferably.

Since the pressure reduction control is carried out so that the acceleration $G_2$ becomes zero based on the acceleration $G_2$ obtained, it is possible to suppress the occurrence of a rear lift effectively.

Since the acceleration $G_2$ is obtained as the difference between the component $G_{2B}$ of the vehicle body acceleration in the direction of the tangent L2 and the component $G_{2A}$ of the gravitational acceleration in the direction of the tangent L2, it is possible to determine easily whether or not there is a risk of occurrence of a rear lift based on whether the difference takes a minus value or a plus value. Thus, it is possible to suppress the occurrence of a rear lift effectively.

When the acceleration $G_1$ in the direction of the front wheel axle FA is equal to or smaller than the predetermined value X, that is, when a load which contracts the front fork, not shown, of the front wheel FT largely is applied to the front wheel FT when the vehicle BK1 is being decelerated, it is determined that there is a risk of occurrence of a rear lift, and the rear lift suppression function is preferably exhibited irrespective of the magnitude of the acceleration $G_2$. This can suppress the occurrence of a rear lift effectively.

(Second Embodiment)

Figure 10:
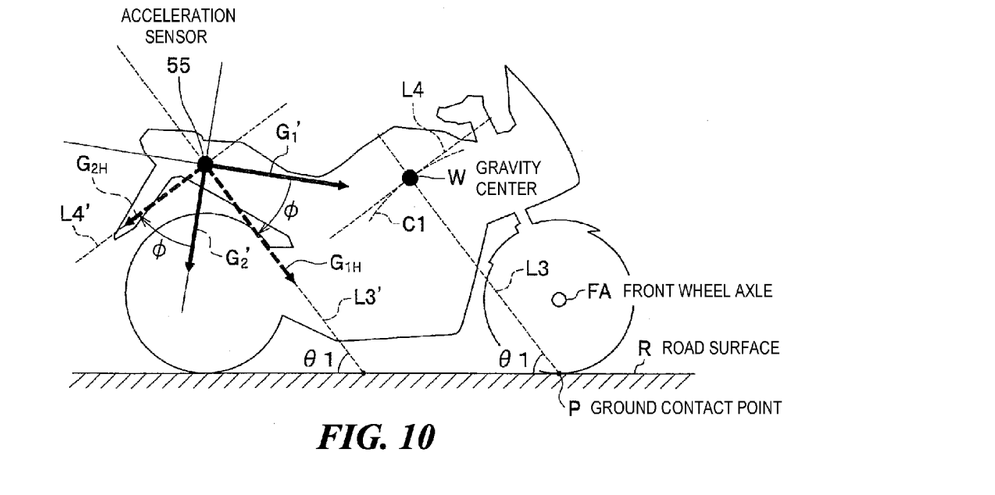
FIG. 10 is a schematic diagram showing a relationship between an acceleration censor and a gravity center of a bar-handle vehicle in a bar-handle vehicle brake control apparatus according to a second embodiment.

A bar-handle vehicle brake control apparatus according to a second embodiment will be described by reference to FIGS. 10 to 13. FIG. 10 is a schematic diagram of a bar-handle vehicle which shows a relationship between an acceleration sensor and a gravity center of a vehicle.

This embodiment differs from the previous embodiment in that a coordinate axis of an acceleration $G_{1H}$ is parallel to a straight line L3 which connects a gravity center W of the vehicle with a ground contact point P of a front wheel and a coordinate axis of an acceleration $G_{2H}$ is parallel to a tangent L4 at a point where the straight line L3 intersects a circle C1 which is centered at the ground contact point P of the front wheel, and converted accelerations $G_{1H}$, $G_{2H}$ are used as accelerations $G_1$, $G_2$ which are acquired at the gravity center W of the vehicle.

In this embodiment, too, the accelerations $G_{1H}$, $G_{2H}$ are obtained by the expressions (4), (5) described before.

$$G_{1H} = G_1' \times \cos\phi + G_2' \times \sin\phi \quad (4)$$

$$G_{2H} = G_2' \times \sin\phi + G_2' \times \cos\phi \quad (5)$$

The obtained accelerations $G_{1H}$, $G_{2H}$ are replaced as the accelerations $G_1$, $G_2$ at the gravity center W of the vehicle and are then outputted to a rear lift suppression control part 27.

Figure 11:
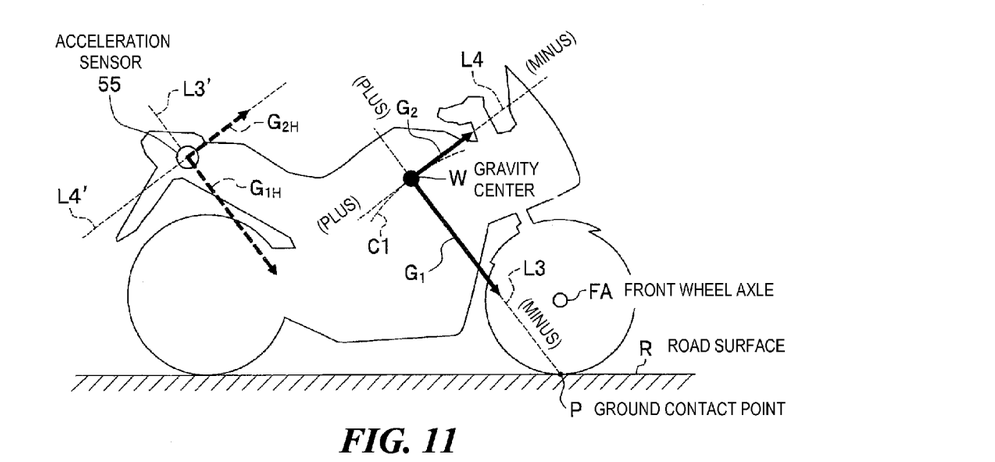
FIG. 11 is a schematic diagram showing acceleration which is applied to the periphery of the gravity center.

As shown in FIG. 11, in the acceleration $G_1$ on the straight line L3 which passes through the gravity center W of the vehicle, an acceleration directed from the gravity center W of the vehicle towards the ground contact point P of the front wheel is a minus acceleration, and an acceleration directed in a direction opposite to the minus acceleration is a plus acceleration. In the acceleration $G_2$ on the tangent L4 which passes through the gravity center W of the vehicle, an acceleration directed from the gravity center W of the vehicle in a direction opposite to the direction of gravity is a minus acceleration, and an acceleration directed in the direction of gravity is a plus acceleration.

When the bar-handle vehicle is decelerated, as indicated by a thick arrow on the straight ling L3 in FIG. 11, a minus acceleration $G_1$ is applied, and as indicated by a thick arrow on the tangent LA, a minus acceleration $G_2$ is applied.

Figure 12:
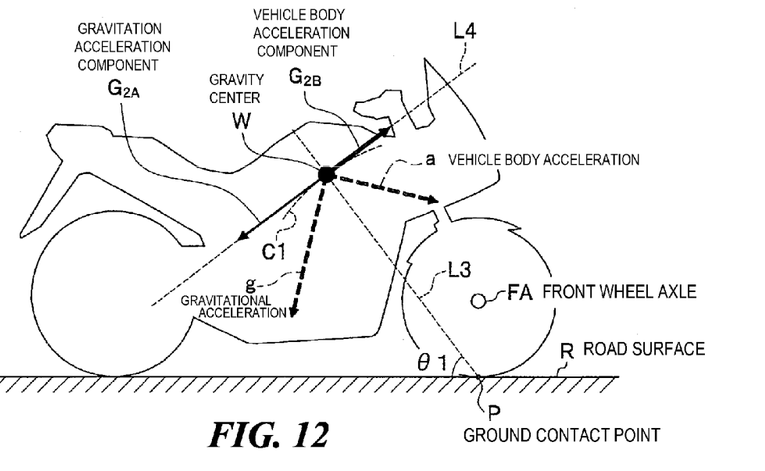
FIG. 12 is a schematic diagram showing a relationship between a vehicle body acceleration component and a gravity component.

Here, the acceleration $G_2$ is, as shown in FIG. 12, a difference between a component $G_{2A}$ of the gravitational acceleration in the direction of the tangent L4 and a component $G_{2B}$ of the vehicle body acceleration in the direction of the tangent L4 and is obtained by the following expression (6) in a similar manner to that in the previous embodiment.

$$G_2 = G_{2A} - G_{2B} \quad (6)$$

Namely, a rear lift is suppressed when the acceleration $G_2$ is a plus acceleration by the expression (6) above, and on the contrary to this, when the acceleration $G_2$ becomes a minus acceleration (when the component $G_{2B}$ of the vehicle body acceleration becomes larger than the component $G_{2A}$ of the gravitational acceleration), there is caused a risk of occurrence of a rear lift.

Figure 13:
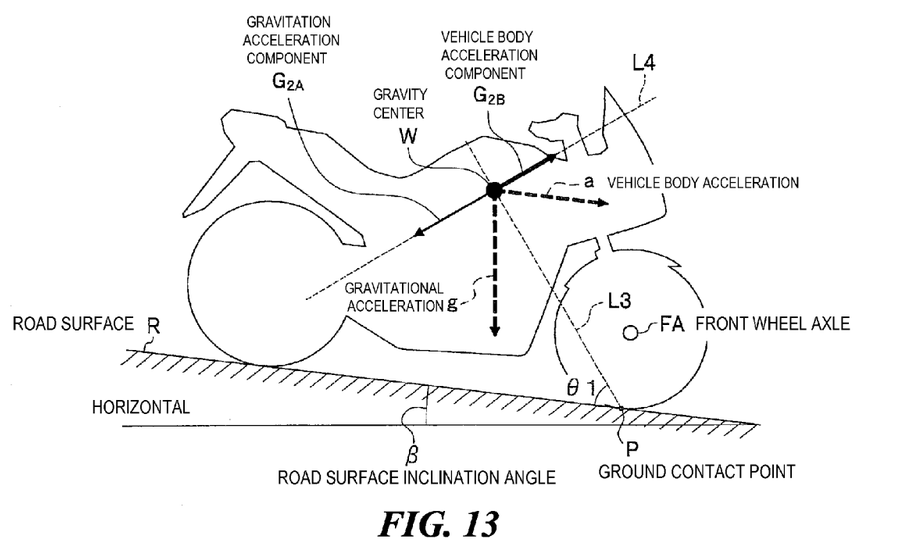
FIG. 13 is a schematic diagram showing a relationship between a vehicle body acceleration component and a gravity component when a road surface is inclined.

For example, as shown in FIG. 13, when the vehicle BK1 is running on a downhill of a road surface inclination angle β (a gradient β), the component $G_{2B}$ of the vehicle body acceleration and the component $G_{2A}$ of the gravitational acceleration are obtained by the following expressions (10), (11).

$$G_{2B} = a \times \sin\theta1 \quad (10)$$

$$G_{2A} = g \times \cos(\theta1 + \beta) \quad (11)$$

where g denotes the gravitational acceleration and θ1 denotes the angle formed by the straight line L3 which passes through the gravity center W of the bar-handle vehicle and the ground contact point P of the front wheel and the road surface R.

The reason that the gradient β of the downhill is not taken into consideration in the expression (11) is based on the fact that the value acquired by the acceleration sensor 55 when the vehicle BK1 is running on a downhill and the value acquired by the acceleration sensor 55 when the vehicle BK1 is running on a flat road are almost equal and that limit accelerations at which a rear lift occurs on the downhill and the flat road are almost equal.

In this embodiment, the pressure reduction control is carried out on the front wheel brake FB based on the expressions (10), (11) so that the acceleration "a" is in a relationship expressed by the following expression (2).

$$a \leq g \times \cos(\theta1 + \beta) / \sin\theta1 \quad (2)$$

Then, a pressure reduction control part 27c outputs a pressure reduction control signal Pb for suppression of the occurrence of a rear lift to a control selection part 29 so that the relationship expressed by the expression (2) above results.

Thus, in this embodiment, too, the working effect similar to that obtained in the previous embodiment is obtained. Namely, according to the brake control apparatus 100A of this embodiment which has been described heretofore, it is possible to determine on the risk of occurrence of a rear lift in the bar-handle vehicle based on the acceleration $G_2$ obtained. Then, when there is the risk of occurrence of a rear lift, the pressure reduction control can be carried out on the front wheel brake FB by the control unit 20A. Consequently, the occurrence of a rear lift can be suppressed preferably.

While the embodiments have been described, the invention is not limited thereto, and hence, the design can be altered or modified as required without departing from the spirit and scope of the invention.

For example, a road surface inclination angle sensor may be disposed in the vehicle BK1 to detect a road surface inclination angle β. Also in this case, it is possible to obtain a brake control apparatus 100A which can preferably suppress the occurrence of a rear lift.

The invention claimed is:

1. A bar-handle vehicle brake control apparatus comprising:
an acceleration acquiring part which acquires
a first acceleration corresponding to an acceleration that is on a straight line which connects a gravity center of a bar-handle vehicle and a front wheel axle and that is in an axle direction directed toward the front wheel axle, and
a second acceleration corresponding to an acceleration that is in a tangential direction at a point where the straight line intersects a circle which is centered at the front wheel axle; and
a control unit which controls a front wheel brake based on the acquired first acceleration and the acquired second acceleration.

2. The control apparatus of claim 1,
wherein control unit controls the front wheel brake so that the second acceleration becomes zero.

3. The control apparatus of claim 1,
wherein the control unit controls so that a hydraulic pressure at the front wheel brake is reduced when the hydraulic pressure at the front wheel brake needs to be reduced for a rear lift suppression and when a predetermined acceleration is generated in the bar-handle vehicle.

4. The control apparatus of claim 1,
wherein the control unit includes a determination part which determines whether or not there is a risk of occurrence of a rear lift based on the second acceleration and an axle-directed acceleration which is directed to the front wheel axle, and
wherein the determination part determines that a rear wheel is being lifted regardless of a component of the second acceleration when the axle-directed acceleration is equal to or smaller than a predetermined value.

5. The control apparatus of claim 1,
wherein the control unit controls the front wheel brake so that a vehicle body acceleration "a" of the bar-handle vehicle is in a relationship expressed by the following expression (1):

$$a \leq g \times \cos(\theta+\beta)/\sin\theta \quad (1),$$

where g is a gravitational acceleration, where θ is an angle formed by the straight line which passes through the gravity center of the bar-handle vehicle and the front wheel axle and a road surface, and where β is an inclination angle of the road surface.

6. The control apparatus of claim 1, wherein
the acceleration acquiring part acquires an acceleration $G_1'$ and an acceleration $G_2'$,
the acceleration $G_1'$ follows a longitudinal direction of the bar-handle vehicle,
the acceleration $G_2'$ follows a direction of gravity of the bar-handle vehicle,
an acceleration signal conversion part converts the accelerations $G_1'$ and $G_2'$ into accelerations $G_{1H}$ and $G_{2H}$ whose coordinate axes L1', L2' are parallel to coordinate axes of accelerations $G_1$ and $G_2$ which pass through the gravity center of the bar-handle vehicle, and
the accelerations $G_{1H}$ and $G_{2H}$ approximate to the accelerations $G_1'$ and $G_2'$ which pass through the gravity center of the bar-handle vehicle.

7. The control apparatus of claim 6, wherein the coordinate axis of the acceleration $G_{1H}$ is parallel to a straight line L1 which connects the gravity center of the bar-handle vehicle with the front wheel axle, and the coordinate axis of the acceleration $G_{2H}$ is a parallel to tangent L2 at a point where the straight line L1 intersects the circle which is centered at the front wheel axle.

8. The control apparatus of claim 7, wherein accelerations $G_{1H}$, $G_{2H}$ are obtained by expressions (4), (5), $$G_{1H} = G_1' \times \cos\phi + G_2' \times \sin\phi \quad (4)$$

$$G_{2H} = G_2' \times \sin\phi + G_2' \times \cos\phi \quad (5)$$

where φ denotes a coordinate rotation angle.

9. The control apparatus of claim 8, wherein
the acceleration $G_2$ is a difference between a component $G_{2A}$ of a gravitational acceleration in the direction of the tangent and a component $G_{2B}$ of a vehicle body acceleration in the direction of the tangent and is obtained by expression (6)

$$G_2 = G_{2A} - G_{2B} \quad (6), \text{ and}$$

when the acceleration $G_2$ becomes a minus acceleration which is when the component $G_{2B}$ of the vehicle body acceleration becomes larger than the component $G_{2A}$ of the gravitational acceleration, there is a risk of occurrence of a rear lift.

10. The control apparatus of claim 9, further comprising a pressure reduction area determination part which determines whether or not a pressure reduction control needs to be carried out on a front wheel brake to suppress occurrence of the rear lift based on the accelerations $G_1$, $G_2$, wherein it is determined that the pressure reduction control is to suppress the occurrence of the rear lift when the accelerations $G_1$, $G_2$ reside in a pressure reduction area set where $G_1 < 0$ and $G_2 < 0$, as well as an area where the acceleration $G_1$ is equal to or smaller than a predetermined value X (X<0).

11. The control apparatus of claim 10, wherein when the acceleration $G_1$ in the direction of the front wheel axle is equal to or smaller than the predetermined value X, it is determined that there is a risk of occurrence of the rear lift, and a rear lift suppression function is exhibited irrespective of a magnitude of the acceleration $G_2$.

12. The control apparatus of claim 10, wherein the pressure reduction control is carried out on the front wheel brake so that acceleration "a" is in a relationship expressed by expression (1)

$$a \leq g \times \cos(\theta+\beta)\sin\theta. \quad (1)$$

13. The control apparatus of claim 12, wherein
during deceleration of the bar-handle vehicle, when the acceleration $G_2$ is detected by an acceleration sensor becomes minus acceleration $G_2$ and the component $G_{2B}$ of the vehicle body acceleration takes a larger value than that of the component $G_{2A}$ of the gravitational acceleration, the pressure reduction area determination part determines that the pressure reduction control for suppression of the occurrence of the rear lift is necessary,
an acceleration determination part further determines whether or not a predetermined acceleration is being generated based on the acceleration "a," and when the acceleration determination part determines that the acceleration "a" is being generated, a request for pressure reduction control for suppression of the occurrence of the rear lift is made by a pressure reduction control part, and a pressure reduction control signal Pb which signals that the pressure reduction control should be carried out on the front wheel brake is outputted to a control selection part by a rear lift suppression control part, then, the control selection part selects the pressure reduction control for suppression of the occurrence of the rear lift as the control of highest priority when a pressure reduction control signal Pa of an ABS control has not yet been inputted thereinto, and controls a hydraulic unit for pressure reduction at the front wheel brake.

14. The control apparatus of claim 1, wherein the acceleration acquiring part further acquires an axle-direction acceleration toward the front wheel axel, the axel-direction acceleration being on the straight line which connects the gravity center of the bar-handle vehicle and the front wheel axle, and the control unit controls the front wheel brake based on the tangential second acceleration and the axel-direction acceleration.

15. A bar-handle vehicle brake control apparatus comprising:

an acceleration acquiring part which acquires a tangential acceleration at a point where a straight line which connects a gravity center of a bar-handle vehicle and a front wheel axle intersects a circle which is centered at the front wheel axle; and a control unit which controls a front wheel brake based on the tangential acceleration, wherein the control unit selects either a pressure reduction control in an ABS control or a pressure reduction control for a rear lift suppression, which has a larger pressure reduction pulse, in preference to a holding control in the ABS control and a pressure increase control in the ABS control.

16. A bar-handle vehicle brake control apparatus, comprising an acceleration acquiring part which acquires a first acceleration corresponding to an acceleration that is on a straight line which connects a gravity center of a bar-handle vehicle and a ground contact point of a front wheel and that is in a ground-contact-point direction directed toward the ground contact point of the front wheel, and a second acceleration corresponding to an acceleration that is in a tangential direction at a point where the straight line intersects a circle which is centered at the ground contact point of the front wheel; and a control unit which controls a front wheel brake based on the acquired first acceleration and the acquired second acceleration.

17. The control apparatus of claim 16, wherein the control unit controls the front wheel brake so that the second acceleration becomes zero.

18. The control apparatus of claim 16, wherein the control unit controls so that a hydraulic pressure at the front wheel brake is reduced when the hydraulic pressure at the front wheel brake needs to be reduced for a rear lift suppression and when a predetermined acceleration is generated in the bar-handle vehicle.

19. The control apparatus of claim 16, wherein the control unit includes a determination part which determines whether or not there is a risk of occurrence of a rear lift based on the second acceleration and a ground contact point-directed acceleration which is directed to the ground contact point of the front wheel, and wherein the determination part determines that a rear wheel is being lifted regardless of a component of the second acceleration when the ground contact point-directed acceleration is equal to or smaller than a predetermined value.

20. The control apparatus of claim 16, wherein, when the bar-handle vehicle is decelerated, the control unit controls the front wheel brake so that a vehicle body acceleration "a" of the bar-handle vehicle is in a relationship expressed by the following expression (2):

$$a \leq g \times \cos(\theta_1 + \beta)/\sin\theta_1 \qquad (2),$$

where g is a gravitational acceleration, where $\theta_1$ is an angle formed by the straight line which passes through the gravity center of the bar-handle vehicle and the ground contact point of the front wheel and a road surface, and where $\beta$ is an inclination angle of the road surface.

21. The control apparatus of claim 16, wherein the acceleration acquiring part further acquires a ground-contact-point-direction acceleration toward the ground contact point, the ground-contact-point-direction acceleration being on the straight line which connects the gravity center of the bar-handle vehicle and the ground contact point of the front wheel, and the control unit controls the front wheel brake based on the second acceleration and the ground-contact-point-direction acceleration.

22. A bar-handle vehicle brake control apparatus, comprising an acceleration acquiring part which acquires a tangential acceleration at a point where a straight line which connects a gravity center of a bar-handle vehicle and a ground contact point of a front wheel intersects a circle which is centered at the ground contact point of the front wheel; and a control unit which controls a front wheel brake based on the tangential acceleration, wherein the control unit selects either a pressure reduction control in an ABS control or a pressure reduction control for a rear lift suppression, which has a larger pressure reduction pulse, in preference to a holding control in the ABS control and a pressure increase control in the ABS control.

* * * * *